US006847298B2

(12) United States Patent
Lunenburg et al.

(10) Patent No.: US 6,847,298 B2
(45) Date of Patent: Jan. 25, 2005

(54) DATA TRANSMISSION

(75) Inventors: Pieter Cornelis Lunenburg, Waiuku (NZ); Robert Charles Bryan Woodhead, Howick (NZ)

(73) Assignee: Tru-Test Limited, Mt. Wellington (NZ)

( * ) Notice: Subject to any disclaimer, the term of this patent is extended or adjusted under 35 U.S.C. 154(b) by 337 days.

(21) Appl. No.: 10/025,604

(22) Filed: Dec. 26, 2001

(65) Prior Publication Data

US 2002/0082715 A1 Jun. 27, 2002

(30) Foreign Application Priority Data

Dec. 22, 2000 (NZ) .................................................. 509130

(51) Int. Cl.$^7$ ................................................ G08B 13/26

(52) U.S. Cl. ...................... 340/564; 340/561; 340/531; 340/538

(58) Field of Search ................................ 340/540, 541, 340/561, 562, 563, 564, 566, 567, 551, 531, 538, 310.01, 539.1, 539.26; 375/239

(56) References Cited

U.S. PATENT DOCUMENTS

| 5,420,885 A | * | 5/1995 | May ............................ 375/239 |
| 5,651,025 A | * | 7/1997 | May ............................ 375/239 |
| 5,969,608 A | * | 10/1999 | Sojdehei et al. ............ 340/551 |

FOREIGN PATENT DOCUMENTS

DE        101 63 406 A1 *  8/2002

* cited by examiner

*Primary Examiner*—Van T. Trieu
(74) *Attorney, Agent, or Firm*—Young & Thompson

(57) ABSTRACT

A data transmission system which is particularly useful for a remote control apparatus for an electric fence. The apparatus includes a portable hand held housing with a contact 16 which in use can contact a conductor of an electric fence line. The output of the apparatus includes a resonating circuit with inductor L, transformer 14 and a small high voltage capacitor C2. The apparatus can thus generate information embedded within a series of short signal bursts of a frequency within a predetermined frequency range. A receiver coupled to or forming part of an electric fence energizer can receive a signal from the apparatus to control operation of the energizer.

11 Claims, 1 Drawing Sheet

DATA TRANSMISSION

BACKGROUND OF THE INVENTION

This invention relates to improvements in data transmission, in particular data transmission along electric fences.

Electric fences are used for a number of purposes, the most well known applications are for managing livestock or for building or property security purposes. The common form of an electric fence is where one or more conductors are held in place by fence posts, at a suitable height above the ground. The conductors are electrically insulated from the ground by suitable application of insulating materials. The conductors are connected to an apparatus commonly known as an electric fence energiser, which periodically applies an electric pulse of high voltage (usually in the range of 1 kV to 10 kV) and of short duration (usually less than 1 ms) to the conductors. When touching the electric fence, the electric pulse is experienced as unpleasant or painful, forming an effective deterrent against crossing or applying pressure to the electric fence.

In many situations where electric fences are employed it is of advantage that the energiser can be remotely turned on and off. For example, a user may wish to make adjustments to an electric fence (e.g. repairs or change connections) at certain points of the fence, located at a considerable distance from the energiser. If this user had a means of remotely controlling the energiser then he or she would be able to do so with the energiser turned off and thereby avoid any risk of receiving an electric shock. When the adjustments have been made the user can turn the energiser back on immediately and check the result of the adjustments made.

It is known to use the conductor(s) of an electric fence as the medium for carrying the signals of the remote control system. It is also known to use this transmission of data for purposes other than remote control e.g. transmitting information about the water level in a tank located somewhere in the vicinity of the electric fence, information about the amplitude of the electric fence pulses at various locations along the electric fence line, etc.

For various reasons, known remote control systems relying on transmission of data along an electric fence conductor have suffered from drawbacks. For example, it has been suggested to use a low voltage DC signal to transmit along an electric fence, however, this method often performs very poorly on larger installations and on installations which receive limited servicing. This poor performance is often due to excessive attenuation of the low voltage DC signal by poor or defective wire joints along the electric fence.

It has been proposed to transmit data via a set of high voltage DC pulses along a fence line. The high voltage DC pulses are transmitted in a pattern that is "known" by the receivers' circuits. Thus the pulses are readily distinguished from natural electrical noise, man made electrical noise and from the high voltage pulses generated by the electric fence energiser. This system seeks to overcome the problem of attenuation of the signal by poor or defective wire joints by applying a sufficiently high voltage on the fence wire to form an arc across the gap.

Because it is desirable that the transmitter can be made a battery powered portable device and thus be hand held by the user, there are practical limitations that restrict the size and weight of the transmitting device. This in turn places practical limitations on the energy content of the high voltage pulses.

It has been suggested to use an AC signal to implement an electric fence remote control system. The system toggles a switch that enables, or disables the energiser once the presence of the AC signal has been detected on the conductors of the electric fence. The suggested arrangement is limited solely to controlling the energiser and does not include the option of transferring information for other useful functions.

A further proposed system uses a carrier frequency that is phase modulated with the information, along with a certain amount of extra information to enhance the reliability of the transmission method. The transmission method transmits the information as a group of digital bits or "data block".

Phase modulation provides good performance when compared to many other modulation systems especially under circumstances where the signal may encounter distortion, attenuation and/or electrical noise. However, if a fence wire develops a defective wire joint where the electrical connection is actually broken by the two wires separating for a small distance eg. 0.1 mm–1 mm, the phase modulated signals suffer the same attenuation as the signals of the other methods previously described and in many cases the transmitted information cannot be recovered at the receiver.

A system for transmission of data along electric fences which performs poorly where small gaps and/or poor electrical wire joints are present is undesirable. Defective wire joints are very common in electric fences through the fence wires being continually exposed to climatic conditions and usually being under mechanical strain. Erosion and arcing are also common occurrences. Furthermore, electrical cut-out switches are often employed to enable the user to turn parts of the electric fence on or off. Many cut-out switches are simple mechanical devices and over time can develop poor electrical contacts or gaps caused by poor mechanical alignment, corrosion and/or dirt. However, the electric fence will usually continue to be effective since the voltage developed by the electric fence energiser is often high enough to form an arc across small gaps.

SUMMARY OF THE INVENTION

An object of the present invention is thus to provide a method and means of transmission of data along electric fences which will have a high level of reliability or at least is able to provide the public with a useful choice.

According to one broad aspect of the invention, there is provided a method of transmitting information along a fence conductor wherein the information is embedded within and spread across a series of short high voltage signal bursts of a high frequency.

In a preferred form, the frequency range is between substantially 50 to 190 kHz. Preferably the transmitted signal bursts have an amplitude up to several thousand volts. The duration of individual bursts is preferably in the range of 100 microseconds to 1000 microseconds.

Each signal burst can contain one or more digital bits. The digital bits are preferably encoded on the high frequency signal bursts using frequency modulation.

According to a second broad aspect of the invention, there is provided a remote control apparatus for an electric fence the apparatus including a housing, contact means for contacting a conductor of the electric fence and generating means for generating information embedded within a series of short signal bursts of a frequency within a predetermined frequency range.

In a preferred form of the invention the housing also houses a volt/current meter. A separate contact means may also be provided for voltage measurement by the volt/current meter.

According to the present invention frequency modulation (known as FM or frequency shift keying, FSK) provides high tolerance to wide amplitude variations (extremely strong and very weak signals) while at the same time retaining a high degree of information transmission reliability.

As stated above, it is known to use high voltages generated by the transmitter to enhance the reliability of the system by being able to overcome poor electrical contacts, either by arcing or by means of capacitive coupling across the poor contact. Capacitive coupling becomes more effective as the carrier frequency is increased. However, signals generally also suffer loss of energy as they travel along an electric fence due to the electric resistance of the wires (conduction losses), due to currents generated into and in the earth beneath the wires (dielectric losses and induction losses) and due to energy being emitted into free space (radiation losses). These latter types of losses tend to become more pronounced as the carrier frequency is increased.

Also the choice of carrier frequency is not entirely free. A commercially available system also has to comply with national and international regulations restricting the use of certain frequencies in frequency bands. Also many frequency bands are undesirable because they are in use for other means e.g. such as radio broadcasting stations.

Thus for a given (not ideal) electric fence installation there will be an optimum frequency where the amount of energy reaching the receiver is at a maximum.

All hand held devices (and also many non-hand held devices) that are to be connected to an electric fence conductor require some form attenuation of the high voltage generated by the energiser to protect the circuits internal to the device from being damaged. A common method of achieving this is to use a transformer capable of withstanding a high pulse voltage on the secondary winding. Such a transformer is, however, bulky and relatively expensive.

Another method is to use a high voltage optical isolating means. This is not commercially attractive as it requires a secondary power source.

According to the present invention, a high voltage capacitor is used to provide the necessary attenuation of the high voltage pulses. The value of the high voltage capacitor is chosen as a compromise to maximise attenuation of the high voltage fence pulses and at the same time minimise attenuation of the signal transmitted onto the electric fence. The most practical values for the high voltage capacitor may range from a few pF to several hundred pF. Using such small value capacitors to transfer a signal with a carrier frequency of 190 kHz or lower to an electric fence usually still results in a significant amount of attenuation to that signal.

According to the present invention the capacitor is made part of a resonant circuit which significantly boosts the amount of power that is transferred via the capacitor to the fence wire. As an added benefit the resonating circuit at the output of the transmitting device significantly reduces the signal strength of unwanted signals (in particular harmonics of the carrier frequency) emitted by the transmitting device, which may aid in making the device comply with national and international regulations.

The energiser presents a significant electrical load to the electric fence. This electrical load causes attenuation of the signal that is emitted by the transmitting device. The majority of energisers use a transformer as the output device, with the secondary winding connecting to the output terminals of the energiser. Since the secondary winding normally has a very low electrical resistance, the amount of attenuation can be excessive, especially when the signalling means is a DC voltage or a very low frequency signal. Therefore, many commercially available systems employ a means of reducing the amount of attenuation caused by the energiser. A common means is to insert one or more diodes between the energiser and the "live" conductors of the electric fence. The diodes will allow a signal voltage of at least 0.5V peak, even when the energiser output impedance is extremely low.

With the present invention, however, the carrier frequency of the signal is preferably chosen sufficiently high where the impedance of all or at least nearly all energisers is so high that the amount of signal attenuation becomes minimal. Therefore, the use of series diodes or other devices is not necessary.

According to one preferred embodiment of the present invention the carrier frequency is about 150 kHz. This means that a signal from the device, that is capacitively coupled from part of the fence to another is likely to suffer much less attenuation than known prior art systems. As a consequence, the performance of the device according to the present invention is superior to that of prior art systems.

The choice of a high carrier frequency can also enhance the system when it is to operate under poor earth conditions. In cases where the resistance of the topsoil is high (sandy soil, dry clay soil), the coupling between the transmitting device and the subsoil conducting earth is improved by using a high carrier frequency. This coupling helps ensure that the signal voltage imposed on the fence wire is improved.

According to the preferred form of the present invention the device is capable of producing a high voltage (in the order of 1000V peak) when connected to the electric fence wire. This ensures that the signal will be properly transmitted onto the conductors of the electric fence even when the surface of the conductor itself may have been corroded to a certain extent. However, the electric fence also presents a significant electrical load to the device. Therefore, the transmitter device must be capable of producing a significant amount of instantaneous electrical power (in the order of several watts). Further, since the transmitter in at least one of its preferred embodiments is a hand held device, it is preferably powered by a small, lightweight battery.

As the device according to the present invention transmits information in the form of very short, high power bursts, the energy required for each burst can be drawn from a capacitor contained within the transmitting device. The capacitor can be slowly recharged from a small, lightweight battery during the intervals between bursts. Thus according to the present invention a small, lightweight and low cost battery with a relatively high output impedance can be used whilst providing acceptable service life and achieving high frequency signals with an instantaneous electrical power of several watts.

With the foregoing in mind a preferred embodiment of the transmitting device and of the receiving device will now be described with reference to the accompanying drawing.

DETAILED DESCRIPTION OF THE PREFERRED EMBODIMENT

Figure 1:
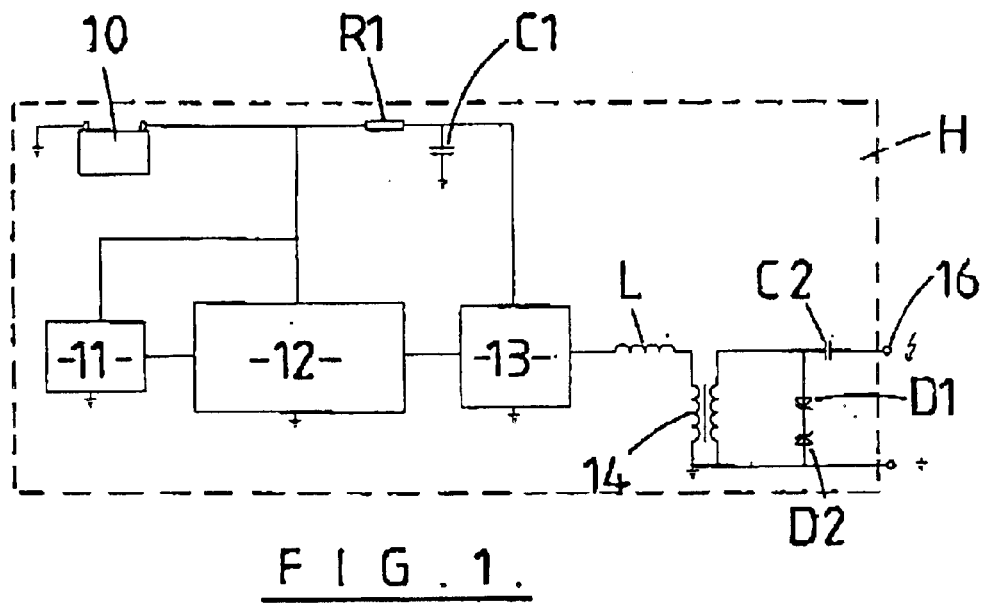
FIG. 1 is a circuit diagram of the transmitting device.

As mentioned previously the power source for the transmitting device is a small, lightweight battery 10 in this case a 9V battery. The componentry of the device is contained within a housing (indicated at "H"). A user interface 11 may consist of a number of lamps and/or a numerical or graphical display and/or a number of pushbutton or other types of switches.

The user interface 11 is connected to a control circuit 12 which will normally be built using one or a number of digital circuits such as a microcontroller. This control system 12 controls the lamps, controls what is shown on the display, reads the state of the switches and, when appropriate, produces a series of signals to the power interface circuit 13.

The power interface circuit 13 amplifies the signals generated by the control circuit 12. The power interface circuit 13 is not powered directly from the battery 10 but from an energy storage capacitor C1. The capacitor C1 is slowly charged by the battery 10 via resistor R1. In the illustrated preferred form of the invention capacitor C1 can be 470 uF with resistor R1 being 10 ohm.

The power interface circuit is coupled in series with an inductor L coupled to the primary winding of transformer 14. Inductor L, the transformer 14 and capacitor C2 form a self-resonating output circuit of the transmitting device. Capacitor C2 is connected to the terminal 16 to which the electric fence conductor can be attached or make contact.

In a preferred embodiment of the transmitting device the inductor L can be of value 4.7 uH, the capacitor C2 50 pF and the transformer 14 have a turns ratio of 8:520. This, however, is only by way of example. With these values the self resonating frequency of the resonant circuit is about 156 kHz.

At the same time high voltage capacitor C2 together with the avalanche diodes D1 and D2 form a high voltage attenuation means that protects the other electronic components in the device, such as transformer 14, from being damaged by high voltage pulses present on the electric fence.

Transformer 14 provides the function of boosting the voltage from low voltage of a few tens of volts peak to peak across the primary winding to in excess of 2000 V peak to peak across the secondary winding.

Figure 2:
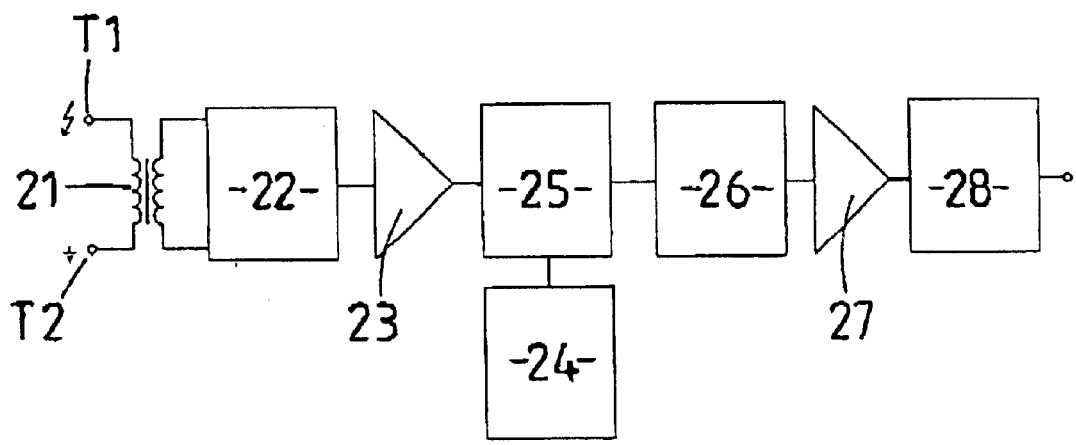
FIG. 2 is a block circuit diagram of the receiving device.

Referring now to FIG. 2 the receiving device is of a construction, up to the microcontroller 28, a form which is based on a direct conversion superheterodyne receiver principle. This is a circuit well known in the art and requires no further description for the purposes of describing the present invention. Other types of receivers may be equally applicable to perform a function of the receiving device of the system according to the present invention.

The receiver circuits are electrically isolated from fence terminals T1 and T2 by transformer 21 which is rated to withstand the voltages normally present on the conductors of an electric fence. In the event that the receiver circuit is incorporated inside an energiser one could take advantage of the high voltage output transformer of the energiser itself to form transformer 21. High voltage isolating means other than a transformer could also be used for isolation from the fence terminals T1 and T2, or in the case where isolation is not required a high voltage capacitive or resistive attenuator could be used.

The transformer 21 could be constructed as two separated coil winding parts, with separate magnetic cores, but held physically in position so as to allow some mutual inductance coupling between them. This arrangement allows for improved high voltage isolation between the electric fence and the receiver circuit. Further to this one or both of the two coil parts may be configured as part of resonant circuits to give comparative improvement in signal amplitude over the designed frequency range of operation.

Connected to the transformer 21 is a bandpass filter 22 which passes signals within a certain frequency band, such as those from the transmitting device, with minimal attenuation. The bandpass filter will significantly attenuate all signals outside this frequency band. Amplifier 23 coupled to the bandpass filter 22 increases the amplitude of signals that pass through the bandpass filter.

A local oscillator 24 and mixer 25 form a method of frequency translation of the received signals. The object of frequency translation is to place the received signals in a frequency band that offers more convenient further processing of the signals than would be the case with direct (untranslated) signals.

The low pass filter 26 together with the frequency translation provided by local oscillator 24 and mixer 25 makes the receiver sensitive to signals in a frequency band centered on the frequency of the local oscillator 24. The signals produced by the transmitting device will fall within this frequency band.

Amplifier 27 further increases the amplitude of the signals that pass through the lowpass filter 26.

The output signal from amplifier 27 is converted from analog to digital form by an analog to digital converter (ADC) that is part of the microcontroller 28. The microcontroller 28 is programmed with an algorithm to process the output of the digital converter to reject noise and signals other than those from the transmitting device and to decode the information that is encoded on the signals from the transmitting device. The microcontroller 28 then can provide one or more internal and/or external output signals that alter state according to the received information. Such an output signal could be used to control the operative state of an electric fence energiser.

The device according to the present invention thus can form a remote control which is portable and hand held. The user can then transmit signals to the receiving device incorporated in or coupled to the electric fence energiser. As a consequence the user can remotely switch the energiser on or off.

According to a further form of the invention, the housing H can incorporate the transmitting device according to the present invention together with a volt- and current-meter such as the meter described in our New Zealand patent specification 501475. A combination of this type it is believed would provide significant saving of time to a user when performing service and maintenance work on electric fence installations.

For example, the user may notice that an electric fence presents an excessively heavy electrical load to an energiser thereby reducing the peak output voltage of the energiser to an undesirably low level. The user can then use the hand held device to carry out volt- and current-measurements functions to locate the cause of the fault, normally located somewhere along the fence line. Once the user has determined the point of the fault he/she may wish to remedy the fault. Thus the device can then be used to remotely turn the energiser off using the handheld device, from the point of the fault. The user can then remedy the fault on the fence, turn the energiser back on and immediately check if the adjustments/repairs have indeed remedied the fault.

The device according to the present invention is thus able to reliably transmit information along electric fences and cope with all conditions commonly found on electric fences such as poor wire joints, corroded wires and electrical contacts, poor earth due to dry soil conditions, short circuits etc. It is able to cope with electrical pulses from the energiser, electrical noise and other signals (e.g. signals from overhead high voltage powerlines, radio broadcasting transmitters etc.) that may be present on the electric fence wire/conductor.

In situations where farms are adjacent to one another, as is very often the case, it is possible that both farms may make use of the same type of information signalling system. The invention described herein is able to transfer signals across significant gaps in electric fences. Thus it is possible that signals transmitted by a transmitting device on one farm may be received by receivers on another farm. This could lead to an undesirable situation. For example a user may have turned his electric energiser off whilst making adjustments on the conductors of the electric fence.

Whilst the user is busy, another user on the adjacent farm may transmit a signal to turn his energiser on, which may also be received by the energiser of the first user whom is then at risk of receiving an electric shock. Another example would be the use of more than one electric fence energiser equipped with a remote control receiver on one farm (which may or may not be electrically connected to the same electric fence). The user may wish to control one energiser, but not the other.

To remedy problems such as those mentioned above the transmitting and receiving devices may be given address numbers. When a transmitting device emits a signal the information carried by the signal includes the address number. Multiple receiving devices may receive the signal, but only receivers with an address that equals the address contained in the received information will accept that information.

The number of possible addresses is only limited by practical considerations. For the majority of applications of the invention a number of possible addresses between four and a few hundred will be adequate.

It is desirable that the user of the invention be able to alter the addresses of the transmitting and receiving devices in his system. For example, referring back to the situation mentioned above where two adjoining farms employ a similar type of system, the two users may wish to set the addresses of the devices in their systems to different numbers, so as to avoid the unintended control of devices on the other farm. The invention allows for the user to choose the addresses of the devices by a simple and user friendly procedure, which involves placing a transmitting device in a 'select address' mode, choosing the appropriate address and then transmitting the chosen address to the devices that should respond to signals containing that address. The devices can retain the address in a re-programmable non-volatile memory device, so that the address is retained indefinitely until such time as it programmed again by the user.

As will be appreciated by those skilled in the art the use of address numbers is only one solution to the problem mentioned above.

Some alternative solutions to using address numbers are:

making the carrier frequency programmable, making the burst rate (time delay between subsequent bursts) programmable, making the modulation frequencies programmable, making the interval between bursts programmable, or any combination of the solutions mentioned above.

The invention allows for using any of the above choices. This is achieved by generating the carrier frequency, the modulation frequencies, the signal bursts and the information all within programmable microcontrollers. Similarly, the receiving device makes use of programmable microcontrollers for reception, detection and decoding of received signals.

Making the carrier frequency programmable offers an advantage not only to the user but also to the manufacturer. Systems may be manufactured identically but can be programmed differently, for example to make the systems comply with regulations in various countries or to avoid frequency bands with known interference sources.

The method and means according to the present invention achieves a high level of reliability for the transmission of data along electric fences.

There may be a number of electric fence installations where even the described invention may still experience difficulty with providing a reliable means of data communication over the electric fence. Examples of such installations may be very large farms and installations where there is a multiplicity of very poor electrical connections on the electric fence. To enhance the performance of the invention, a further measure to take could be to connect additional devices to the electric fence wire, placed at one or more strategic places along the electric fence. These devices would perform the function of boosting the signal strength of the signals emitted by the transmitting device. The device shall be referred to in the following as a 'repeater'.

The repeater essentially comprises the circuits of the receiver with decoding means and the transmitting devices described above. The repeater can receive and decode a message that has been transmitted from any place on the electric fence by the transmitting device and then automatically (re-)transmit the message again to the receiving device. The signal strength of the signal transmitted by the repeater can be higher than that transmitted be the original (hand held) transmitting device, and the probability that a signal of sufficient strength reaches the final receiver is improved. It is also possible to make use of more than one repeater to repeatedly enhance the signal strength. The repeaters may be of a type that the retransmitted signal is simply a copy of the received coded signal, or a more intelligent type that may change or add address, or data information to the message being repeated to possibly improve the overall reliability the communication system.

The repeater may draw the energy it requires to function from an energy storage capacitor or from a battery. The battery may be of a rechargeable type. The capacitor or a rechargeable battery can be automatically charged by means of a photovoltaic solar panel or by making use of the energy provided by the high voltage electric fence pulses from the energiser.

The claims defining the invention are as follows:

1. A method of transmitting information along an electric fence conductor, comprising the steps of:

embedding the information within and spread in time across a series of short high voltage signal bursts, each of the signal bursts being within a predetermined frequency range; and applying the signal bursts to an electric fence conductor.

2. The method according to claim 1 wherein the frequency range is between substantially 50 to 190 kHz.

3. The method according to claim 2 wherein the signal bursts have an amplitude in the range of a fraction of one volt up to a maximum of several thousand volts.

4. The method according to claim 3, wherein the duration of individual ones of the signal bursts is in the range of 100 microseconds to 1000 microseconds.

5. The method according to claim 1, wherein each of the signal bursts is encoded with one or more digital bits.

6. The method according to claim 1, wherein each of the signal bursts contains one or more digital bits that are encoded on the high frequency signal bursts using frequency modulation.

7. A remote control apparatus for an electric fence the apparatus, comprising:

a housing, contact means for contacting a conductor on the electric fence, and generating means for generating information embedded within a series of short signal bursts, each of the signal bursts being within a predetermined frequency range.

8. The apparatus as claimed in claim 7, wherein the frequency range is 50 to 190 kHz.

9. The apparatus as claimed in claim 8, further including high voltage isolation means for isolating a high voltage at an apparatus output, said high voltage isolation means including a capacitor rated to withstand voltages normal present on an electric fence installation.

10. The apparatus as claimed in claim 9, wherein the capacitor forms part of a self-resonant circuit.

11. The apparatus as claimed in claim 10, further including receiving means for receiving a signal from the apparatus, said receiving means being controllably connected with an electric fence energizer to control an operative state of the electric fence energizer.

* * * * *